L. H. BALWICK.
BICYCLE LOCK.
APPLICATION FILED SEPT. 6, 1910.
981,359.
Patented Jan. 10, 1911.
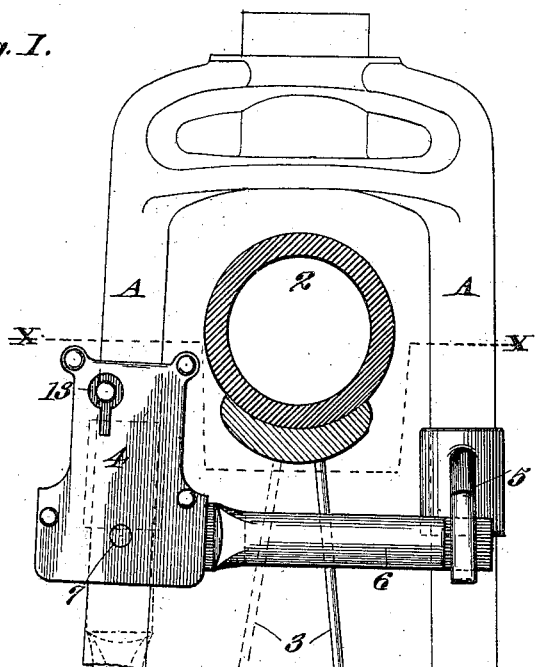
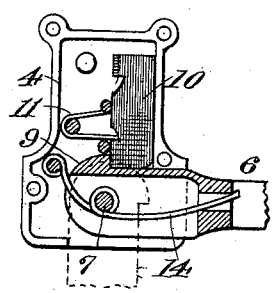
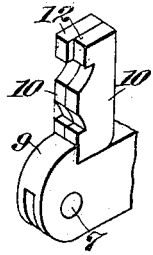
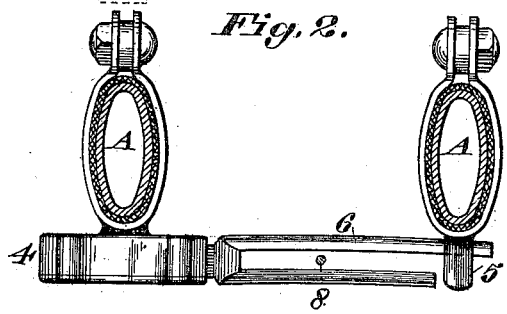
Witnesses,
Charles Pickles
F. E. Maynard
Inventor.
Louis H. Balwick,
By G. H. Strong.
Atty

UNITED STATES PATENT OFFICE.

LOUIS H. BALWICK, OF SAN JOSE, CALIFORNIA.

BICYCLE-LOCK.

981,359.  Specification of Letters Patent.  Patented Jan. 10, 1911.

Application filed September 6, 1910. Serial No. 580,569.

*To all whom it may concern:*

Be it known that I, LOUIS H. BALWICK, a citizen of the United States, residing at San Jose, in the county of Santa Clara and State of California, have invented new and useful Improvements in Bicycle-Locks, of which the following is a specification.

My invention relates to a safety attachment or lock, which is particularly designed for use upon bicycles and similar vehicles.

It consists of a lock attached to one fork or member of the machine having a swinging arm designed to pass through the wheel and engage a spoke thereof, said arm having its opposite end latched upon the other fork member of the machine so that the arm will prevent any revolution of the wheel.

It also comprises details of construction which will be more fully explained by reference to the accompanying drawings, in which—

Figure 1 is an elevation and partial section of a bicycle fork and wheel showing my attachment. Fig. 2 is a horizontal section of the forks through X—X, of Fig. 1. Fig. 3 is a sectional view of the lock. Fig. 4 is an enlarged view of a portion of the locking arm and tumblers.

It is the object of my invention to provide a simple and efficient means for preventing unwarranted interference with bicycles and similar vehicles, and the carrying off or stealing of the same.

As shown in the drawings, A are the forks of a bicycle with which device I have here illustrated my invention as being employed. 2 is the wheel rim, having spokes 3 extending therefrom to the hub in the usual manner, the wheel revolving between the forks A. To one fork of the machine, and preferably near the periphery of the wheel, is fixed a locking device, which comprises a case 4, and upon the opposite fork of the machine is a keeper 5.

6 is an arm, pivoted within the case of the lock, as at 7, and adapted to swing from a vertical position when not in use to a horizontal position with the outer end engaging the keeper when in use, said arm extending through the wheel in such manner as to intercept the spokes and prevent any movement of the wheel. Preferably this arm 6 is slotted and made in two parts, as shown plainly in Fig. 2, and having the open slot of such diameter that the two parts being open at the outer end, the bar may be swung across so that a spoke of the wheel will be held between the two parts of the bar, as indicated at 8. In order to render this mechanism operative, I have shown the rear end of the bar 6 as having a semicircular cam-shaped portion 9, which is adapted to be engaged by notched tumblers 10, which are movable vertically within the lock case 4, and are normally held down by a spring 11. The position of the cam latch 9 is such that when the bar 6 has been turned to project through the wheel and engage the keeper, the spring will force the tumblers 10 down behind the latch 9, and thus prevent the bar from being turned out of engagement with the wheel.

The tumblers 10 may be of any suitable or desired character. In the present instance I have shown the notched ends as being of different lengths, as shown at 12, and these tumblers may be engaged by correspondingly formed and coacting wards of a key, which may be introduced through a key-hole opening 13 in the lock case. These tumblers are of such length and position that when the proper key is used it will engage the tumblers and raise them against the pressure of the spring 11, and out of engagement with the cam latch 9. This will allow the arm 6 to be swung upon its pivot pin 7, and it will drop into a vertical position parallel with the link which carries the lock.

A spring 14 is so disposed that it engages the arm 6 in such manner that as soon as the tumblers have released the cam of the locking bar, the spring 14 will act to turn the bar about its pivot pin, disengaging it from the wheel and retaining it parallel with and in close contact with the fork which carries the lock, the whole being contained in a small compass and convenient for operation.

Whenever a machine is to be left at any point, it is only necessary to swing the locking bar 6 up so as to clasp or engage one of the spokes of the wheel and the keeper, when the latch will retain it in this position to be disengaged only by use of the proper key.

Having thus described my invention, what I claim and desire to secure by Letters-Patent, is:—

The combination with the forks of a bicycle, of a lock case secured to one fork and a keeper secured to the other fork; an arm having one end formed with a head which is pivotally mounted in the case, said head having a cam-shaped outer surface with a square-faced shoulder at the end thereof, and said arm adapted to be extended from one fork to the other so that its free end will engage said keeper; a tumbler vertically slidable in the lock case above the cam-shaped end of the arm, having a spring connected to it whereby the tumbler is projected downwardly to engage said shoulder of said head when the tumbler and shoulder are in register; and a spring within the lock case having one end fixed thereto and the other end engaging the arm at one side of its pivot and normally exerting a closing pressure on the arm, said arm-closing spring adapted to positively remove the free end of the arm from the keeper when the tumbler is raised out of its engagement with the shoulder of the head, and the spring of the tumbler adapted to maintain the tumbler in engagement with the cam-surface of the head when the arm is in its unlocked position.

In testimony whereof I have hereunto set my hand in the presence of two subscribing witnesses.

LOUIS H. BALWICK.

Witnesses:
 JNO. LOGAN,
 VICTOR EKMAN.